United States Patent
Davis

(10) Patent No.: US 8,626,859 B2
(45) Date of Patent: Jan. 7, 2014

(54) CUSTOM MESSAGE PRESENTATION

(76) Inventor: Robert Davis, Springville, UT (US)

(*) Notice: Subject to any disclaimer, the term of this patent is extended or adjusted under 35 U.S.C. 154(b) by 141 days.

(21) Appl. No.: 13/420,246

(22) Filed: Mar. 14, 2012

(65) Prior Publication Data

US 2013/0246539 A1 Sep. 19, 2013

(51) Int. Cl.
*G06F 15/16* (2006.01)

(52) U.S. Cl.
USPC .......................................................... 709/206

(58) Field of Classification Search
USPC .......................................................... 709/206
See application file for complete search history.

(56) References Cited

U.S. PATENT DOCUMENTS

| | | | | |
|---|---|---|---|---|
| 5,324,922 A | * | 6/1994 | Roberts | 235/375 |
| 8,015,059 B2 | * | 9/2011 | Walker et al. | 705/14.11 |
| 8,306,512 B2 | * | 11/2012 | Dixon et al. | 455/414.1 |
| 2011/0297559 A1 | * | 12/2011 | Davis | 206/5.1 |
| 2012/0316948 A1 | * | 12/2012 | Shipley et al. | 705/14.23 |

* cited by examiner

*Primary Examiner* — Krisna Lim

(57) ABSTRACT

For custom message presentation, an identification module identifies an optical code as not communication ready. A message module generates a custom message indexed to the optical code in response to identifying the optical code as not communication ready. The message module further makes the optical code communication ready in response to generating the custom message. In addition, the message module communicates the custom message in response to receiving the optical code and identifying the optical code as communication ready.

20 Claims, 6 Drawing Sheets

| | Optical Code | Address | Identifier | Com Ready | Premature Scan | Activated | User Acct |
|---|---|---|---|---|---|---|---|
| 355a | Optical Code 120a | Address 340a | Identifier 345a | Com Ready 350a | Premature Scan 360a | Activated 365a | User Acct 362a |
| 355b | Optical Code 120b | Address 340b | Identifier 345b | Com Ready 350b | Premature Scan 360b | Activated 365b | User Acct 362b |
| 355c | Optical Code 120c | Address 340c | Identifier 345c | Com Ready 350c | Premature Scan 360c | Activated 365c | User Acct 362c |

CUSTOM MESSAGE PRESENTATION

FIELD

The subject matter disclosed herein relates to message presentation and more particularly relates to custom message presentation.

BACKGROUND

Description of the Related Art

Products and services are often exchanged. It is desirable to include a message with the product or service.

BRIEF SUMMARY

A method for custom message presentation is disclosed. An identification module identifies an optical code as not communication ready. A message module generates a custom message indexed to the optical code in response to identifying the optical code as not communication ready. The message module further makes the optical code communication ready in response to generating the custom message. In addition, the message module communicates the custom message in response to receiving the optical code and identifying the optical code as communication ready. An apparatus and computer program product also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
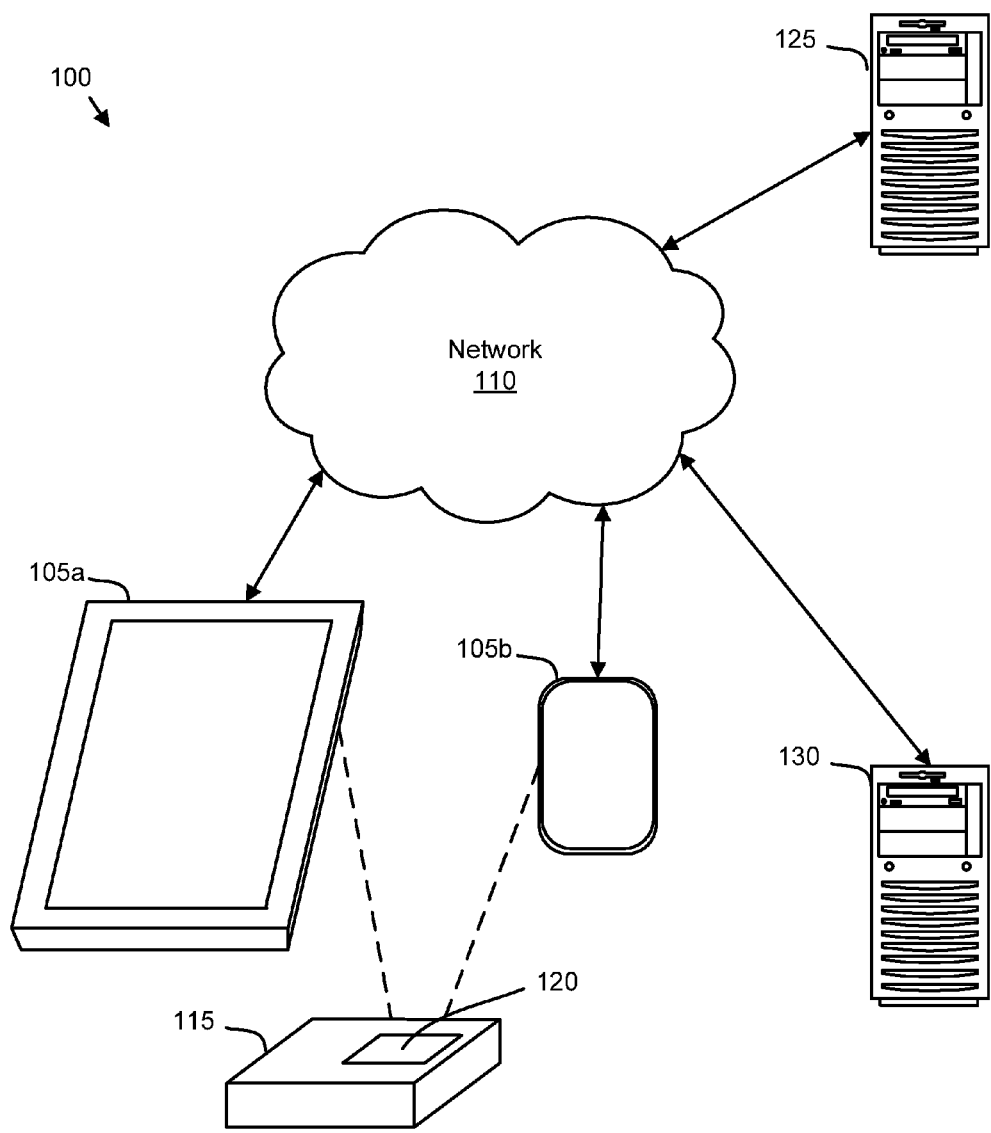
FIG. 1 is a schematic block diagram illustrating one embodiment of a custom message presentation system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer-readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer-readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer-readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer-readable program code may be stored and/or propagated on in one or more computer-readable medium(s).

The computer-readable medium may be a tangible computer-readable storage medium storing the computer-readable program code. The computer-readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer-readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer-readable storage medium may be any tangible medium that can contain, and/or store computer-readable program code for use by and/or in connection with an instruction execution system, apparatus, or device.

The computer-readable medium may also be a computer-readable signal medium. A computer-readable signal medium may include a propagated data signal with computer-readable program code embodied therein, for example, in baseband or as part of a carrier wave. Such a propagated signal may take any of a variety of forms, including, but not limited to, electrical, electro-magnetic, magnetic, optical, or any suitable combination thereof. A computer-readable signal medium may be any computer-readable medium that is not a computer-readable storage medium and that can communicate, propagate, or transport computer-readable program code for use by or in connection with an instruction execution system, apparatus, or device. Computer-readable program code embodied on a computer-readable signal medium may be transmitted using any appropriate medium, including but not limited to wireline, optical fiber, Radio Frequency (RF), or the like, or any suitable combination of the foregoing In one embodiment, the computer-readable medium may comprise a combination of one or more computer-readable storage mediums and one or more computer-readable signal mediums. For example, computer-readable program code may be both propagated as an electro-magnetic signal through a fiber optic cable for execution by a processor and stored on RAM storage device for execution by the processor.

Computer-readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer-readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer-readable program code. The computer-readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer-readable program code may also be stored in a computer-readable medium that can direct a computer, other programmable data processing apparatus, or other devices to function in a particular manner, such that the instructions stored in the computer-readable medium produce an article of manufacture including instructions which implement the function/act specified in the schematic flowchart diagrams and/or schematic block diagrams block or blocks.

The computer-readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer-readable program code.

The description of elements in each figure may refer to elements of proceeding figures. Like numbers refer to like elements in all figures, including alternate embodiments of like elements.

FIG. 1 is a schematic block diagram illustrating one embodiment of a custom message presentation system 100. The system 100 includes one or more electronic devices 105, a network 110, an optical code 120, and a server 125. The system 100 may also include a product 115 and point-of-sale server 130.

The electronic device 105 may be a tablet computer, a cellular telephone, an e-book reader, a notebook computer, a computer workstation, a personal digital assistant, a net book computer, or the like. The electronic device 105 includes an imaging device. The imaging device may be a camera, a video recorder, a scanner, or the like. The electronic device 105 may employ the imaging device to capture an image of a physical rendition of the optical code 120.

In the past, the electronic device 105 scanned the optical code 120 and used the optical code 120 to retrieve a generic message. The embodiments described herein generate and present a custom message in response to scan in the optical code 120 as will be described hereafter.

The optical code 120 may be rendered physically as a QR code, a barcode, an alphanumeric code accompanied by a distinctive design, an alphanumeric string, or combinations thereof. In addition, the optical code 120 may be rendered digitally as an alphanumeric string, an array of digits, and combinations thereof. The digital rendition of the optical code 120 may include a Universal Resource Locator (URL), an Internet address, one or more custom codes, or combinations thereof. The captured optical code 120 may be converted from the image of the physical rendition of the optical code 120 to a digital rendition of the optical code 120.

The physical rendition of the optical code 120 may be incorporated in packaging of the product 115. The packaging may be a box, a clamshell, an envelope, shrink wrap, a card, a certificate, or the like. For example, the optical code 120 may be printed onto the packaging of the product 115. Alternatively, the optical code 120 may be incorporated on the product 115. For example, the optical code 120 may be silk-screened onto the product 115. In one embodiment, the optical code 120 may be printed on a certificate. The certificate may be a postcard, a letter, and Email, or the like.

In one embodiment, the optical code 120 is combined with the product 115 by a user. For example, the user may purchase the optical code 120 separately from the product 115. The optical code 120 may be printed on an adhesive sticker, a card, a tape roll, or the like. The user may then combine the optical code 120 with the product 115 such as by applying a sticker with the optical code 120 to the product 115 or product packaging.

The network 110 may communicate with the electronic device 105, the server 125, and the point-of-sale server 130. The network 110 may be the Internet, a Wide Area Network, a Local Area Network, a cellular telephone network, a Wi-Fi network, or combinations thereof.

The point-of-sale server 130 may receive the optical code 120 through the network 110. In addition, the point-of-sale server 130 may communicate whether the optical code 120 is activated through the network 110 as will be described hereafter.

The electronic device 105 may communicate the optical code 120 through the network 110 to the server 125. In one embodiment, the electronic device 105 employs an address embedded in the optical code 120 to direct the optical code 120 to the server 125. In a certain embodiment, the optical code 120 includes a URL and a custom identifier. The URL may communicate the custom identifier to the server 125.

The server 125 may identify the optical code 120 as not communication ready. As used herein, communication ready refers to an optical code 120 for which a custom message is available for communication. If the optical code 120 is not communication ready, the custom message may not have been generated. Alternatively, the optical code 120 may not be communication ready before a specified date.

In a prophetic example, the optical code 120 may be generated. The optical code 120 may then be affixed to a product 115. The product 115 may be purchased and the optical code 120 may be activated. A user in the role of a sender may scan the optical code 120 and the optical code 120 may be sent to the server 125. Because the optical code 120 is not communication ready, the server 125 may generate a custom message for the sender. In addition, the server 125 may make the optical code 120 communication ready in response to generating the custom message.

The server 125 may subsequently receive the optical code 120 again, such as when a second user in the role of a recipient receives the product 115 and scans the optical code 120. The server 125 may further communicate the custom message to the recipient in response to receiving the optical code 120 and identifying that the optical code 120 is communication ready. Thus the custom message is generated for the optical code 120 when the optical code 120 is not communication ready and the custom message is communicated if the optical code 120 is communication ready.

Figure 2:
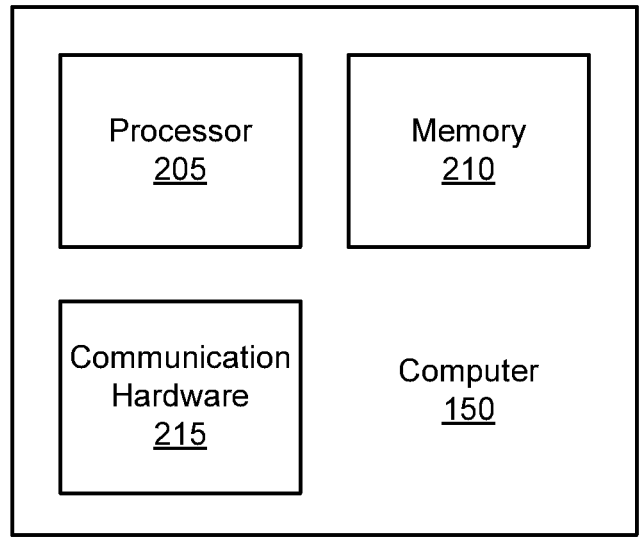
FIG. 2 is a schematic block diagram illustrating one embodiment of a computer.

FIG. 2 is a schematic block diagram illustrating one embodiment of a computer 150. The computer 150 may be the server 125 of FIG. 1. Alternatively, the computer 150 may be the electronic device 105 and/or the point-of-sale server 130 of FIG. 1. The computer 150 includes a processor 205, a memory 210, and communication hardware 215. The memory 210 may store computer-readable program code. The memory 210 may be a semiconductor storage device, a hard disk drive, and optical storage device, and/or combinations thereof. The processor 205 may execute the computer-readable program code. The computer 150 may communicate with other devices through the communication hardware 215.

Figure 3:
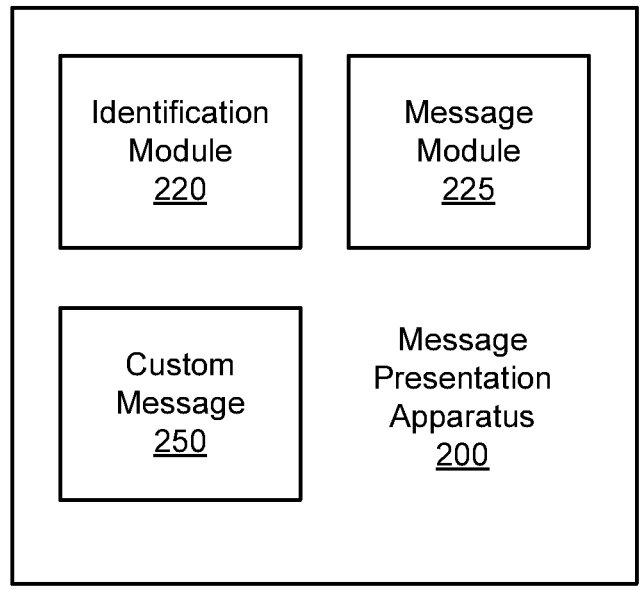
FIG. 3 is a schematic block diagram illustrating one embodiment of a message presentation apparatus.

FIG. 3 is a schematic block diagram illustrating one embodiment of a message presentation apparatus 200. The apparatus 200 may be embodied in the computer 150 of FIG. 2. In a certain embodiment, the apparatus 200 is embodied in the server 125. The apparatus 200 includes an identification module 220 and a message module 225. The identification module 220 and the message model 225 may be embodied in computer-readable program code. The computer-readable program code may be stored in a computer-readable storage medium such as the memory 210 and executed by the processor 205.

The apparatus 200 also includes the custom message 250. The custom message 250 may be an address such as a URL or in Internet address. Alternatively, the custom message 250 may be a digital file. The digital file may include one or more video files, one or more audio files, text data, an address and/or pointer to a video file, an address and/or pointer to an audio file, an address and/or pointer to a text file, and combinations thereof. In one embodiment, the custom message 250 is formatted as an HTML5 file.

The identification module 220 may identify that the optical code 120 is not communication ready. The message module 225 may generate the custom message 250 indexed to the optical code 120 in response to identifying that the optical code is not communication ready. The message module 225 may further make the optical code 120 communication ready in response to generating the custom message 250. In addition, the message module 225 may communicate the custom message 250 in response to receiving the optical code 120 and the identification module 220 identifying that the optical code 120 is communication ready.

Figure 4:
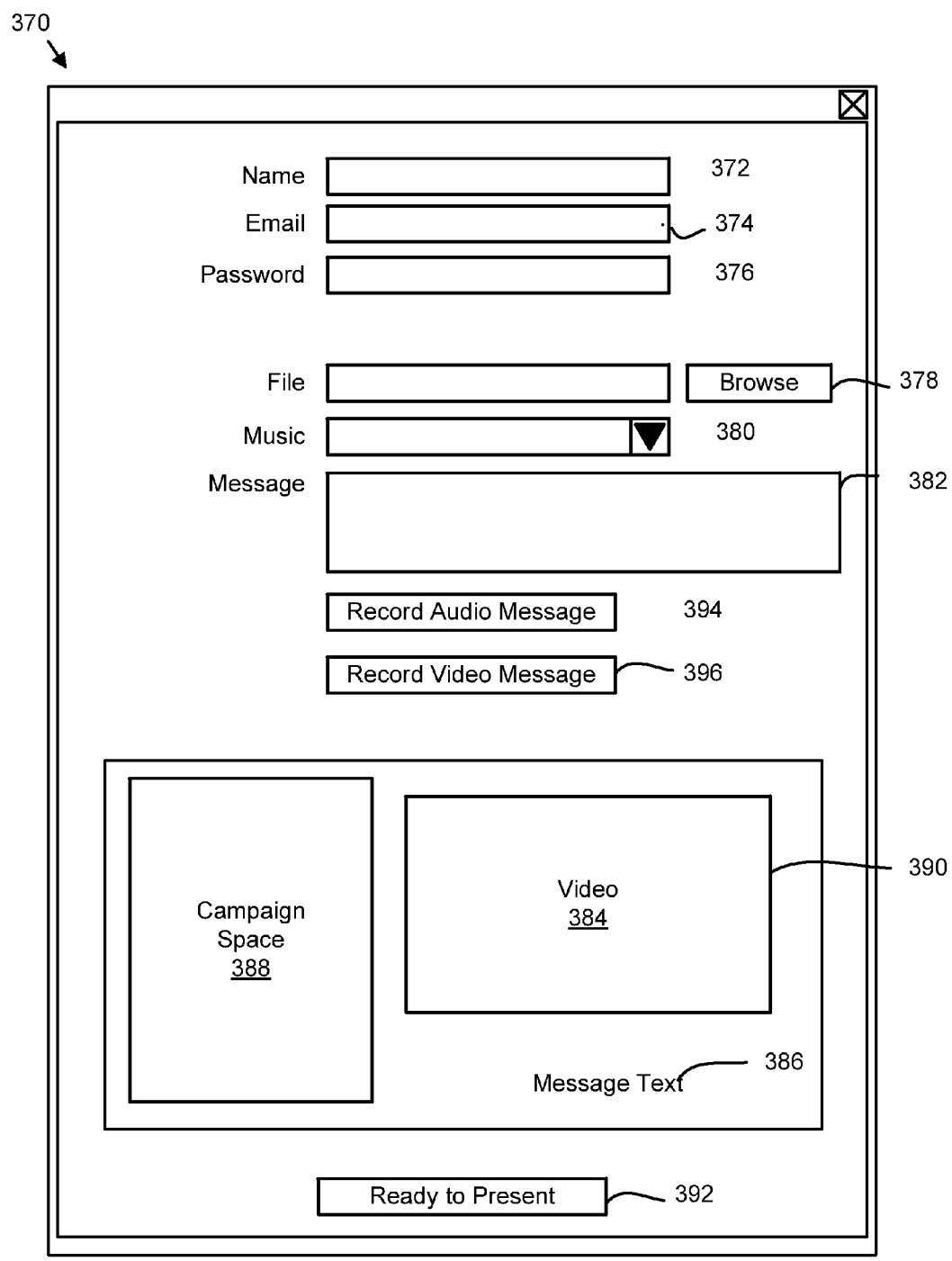
FIG. 4 is a drawing illustrating one embodiment of a message generation interface.

FIG. 4 is a drawing illustrating one embodiment of a message generation interface 370. The message generation interface 370 may be displayed on the electronic device 105 using a browser, a custom application, and the like. In one embodiment, a user such as the sender may employ the message generation interface 370 to establish an account. In addition, the user may employ the message generation interface 370 to generate the custom message 250.

The user may enter user information such as a name 372, an Email address 374, and a password 376 into the message generation interface 370 to establish the account. In addition, the user may upload a file 378 such as a video file, select music 380, and enter text 382 for the custom message 250 through the message generation interface 370.

In one embodiment, the user may select a record audio message icon 394 to record an audio message for inclusion in the custom message 250. Alternatively the user may select a record video message icon 396 to record a video message for inclusion in the custom message 250.

In one embodiment, an arrangement of the custom message 250 is displayed in a preview window 390. The preview window 390 may display material of the custom message 250 such as a video 384, formatted message text 386, and campaign space 388. The campaign space 388 may be filled with client generated content such as an advertisement, a coupon, a certificate, and the like. The user may arrange the material to generate the custom message 250. For example, the user may specify a location of the video 384, a location of the message text 386, colors, fonts, and the like. In a certain embodiment the user may specify the location of the campaign space 388.

In one embodiment, when the custom message 250 is communication ready, the user may select the ready to present icon 392 to indicate that the custom message 250 is communication ready. The message module 225 may make the optical code 120 communication ready in response to the activation of the ready to present icon 392.

Figures 5, 6:
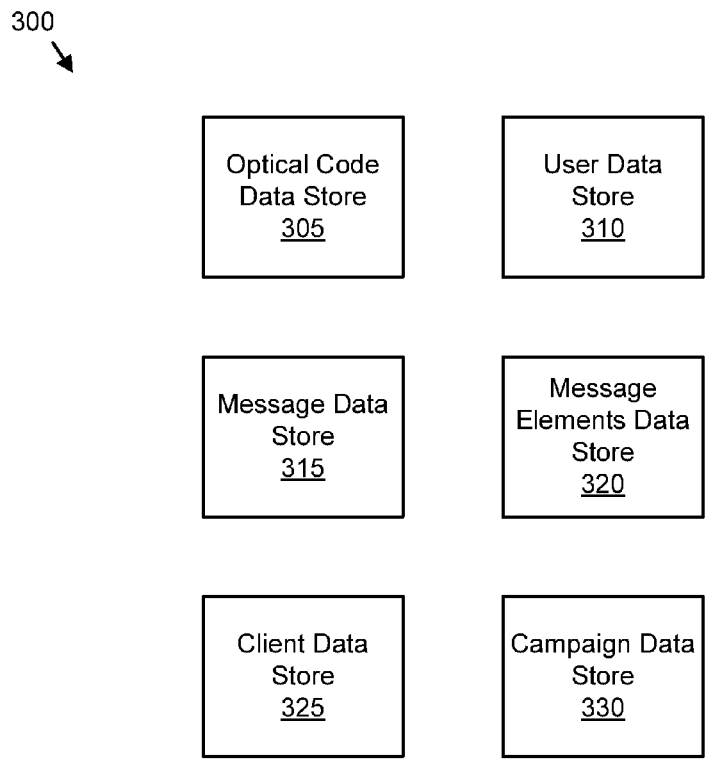
FIG. 5 is a schematic block diagram illustrating one embodiment of a custom message presentation database.
FIG. 6 is a schematic block diagram illustrating one embodiment of an optical code data store.

FIG. 5 is a schematic block diagram illustrating one embodiment of a custom message presentation database 300. The database 300 may be stored on the server 125. Alternatively, the database 300 may be accessed by the server 125. The database 300 includes an optical code data store 305, a user data store 310, a message data store 315, a message elements data store 320, a client data store 325, and a campaign data store 330. A data store may be a table in the database 300, a linked list of data structures, flat files, a discrete database, or the like.

The optical code data store 305 stores the optical codes 120. The optical code data store 305 will be described in more detail hereafter.

The user data store 310 stores user information about users. The users may be at least on of senders and recipients. The user information may be received from the message generation interface 370.

In one embodiment, the user data store 310 may store account information as part of the user information. The account information may include a name 372, a username, a personal identifier, a social media address, an email address 374, a phone number, a password 376, security questions and answers, a physical address, and the like. The user data store 310 may also store profile information about each user. The profile information may include purchase histories, responses to questions about purchase preferences, gender, age, educational background, income, and the like.

The message data store 315 stores the custom messages 250. The custom messages 250 are created by the sender, generated by the message module 225, and stored in the message data store 315. The custom message 250 may include at least one of a URL, a video file, an audio file, an image file, a video transmission, an audio transmission, text, a video selection, an audio selection, an image selection, a text selection, and combinations thereof. For example, the custom message 250 may include an audio selection such as the music selection 380 of the message generation interface 370.

The sender may communicate the video file, the audio file, the image file, and the text to the server 125. For example, the message module 225 may upload the video file and store the video file in the message data store 315 using the file upload 378 of the message generation interface 370. The sender may also transmit the video transmission and the audio transmission to the server 125. The message module 225 may record and store the video transmission and the audio transmission in the message data store 315. The message module 225 may generate a URL for the optical code 120. The URL may access a custom message 250 in the message data store 315. Alternatively the user may provide the URL.

The message elements data store 320 may include message elements such as video files, image files, audio files, fonts, and the like. In one embodiment, the sender may select one or more message elements from the message elements data store 320 for inclusion with the sender's custom message 250. For example, the sender may use the music selection 380 of the message generation interface 370 to select an audio file from the message elements data store 320 for inclusion in the custom message 250.

The client data store 325 may store client information for a client. In one embodiment, a client creates a campaign that uses the optical codes 120 to allow the sender to send the custom message 250 to the recipient. The client data store 325 may include the client's name, email address, password, and billing information.

The campaign store 330 may store campaign information for one or more campaigns for each client. The campaign information may include promotional messages and identifiers of the client. The promotional messages may include video, audio, text, and formatting that may be presented with the custom message 250 such as in the campaign space 388. The identifiers may include logos, trade dress, color schemes, fonts, and the like.

In one embodiment, the client enters the client information and the campaign information into the client data store 325 and the campaign store 330 respectively using a client interface. The client interface may be a web browser application, a mobile device application, or the like.

FIG. 6 is a schematic block diagram illustrating one embodiment of an optical code data store 305. The optical code data store 305 is the optical code data store 305 of FIG. 5. The optical code data store 305 includes a plurality of entries 355. Each entry 355 may include the optical code 120, an address 340, an identifier 345, a communication ready value 350, a premature scan value 360, an activated value 365, and a user account 362. The address 340 may be a URL. In one embodiment, a specified URL is common to all optical codes 120 for a specified campaign. The identifier 345 may be unique to each optical code 120. In one embodiment, the identifier are 345 is appended to the address 340 to form the optical code 120.

The communication ready value 350 indicates whether the optical code 120 is communication ready. The communication ready values 350 may be a flag, a percent complete, and the like. For example, the communication ready value 350 may be set to true when a custom message 250 is communication ready. Alternatively, the communication ready value 350 may be increased as elements are added to a custom message 250. The custom message 250 may be communication ready when the customer value 350 exceeds a specified threshold. In one embodiment, the communication ray value 350 is initialized to a not communication ready value.

The activated value 365 may indicate that the optical code 120 is activated by the point-of-sale server 130. For example, if the optical code 120 and/or the product 115 with the optical code 120 is sold and activated by merchant, the merchant's point-of-sale server 130 may communicate the activation to the server 125. The server 125 may then set the activated value 365 to true. The premature scan value 360 may indicate that the optical code 120 has been received before the optical code 120 is activated. The user account value 362 may reference a user account in the user data store 310.

Figure 7:
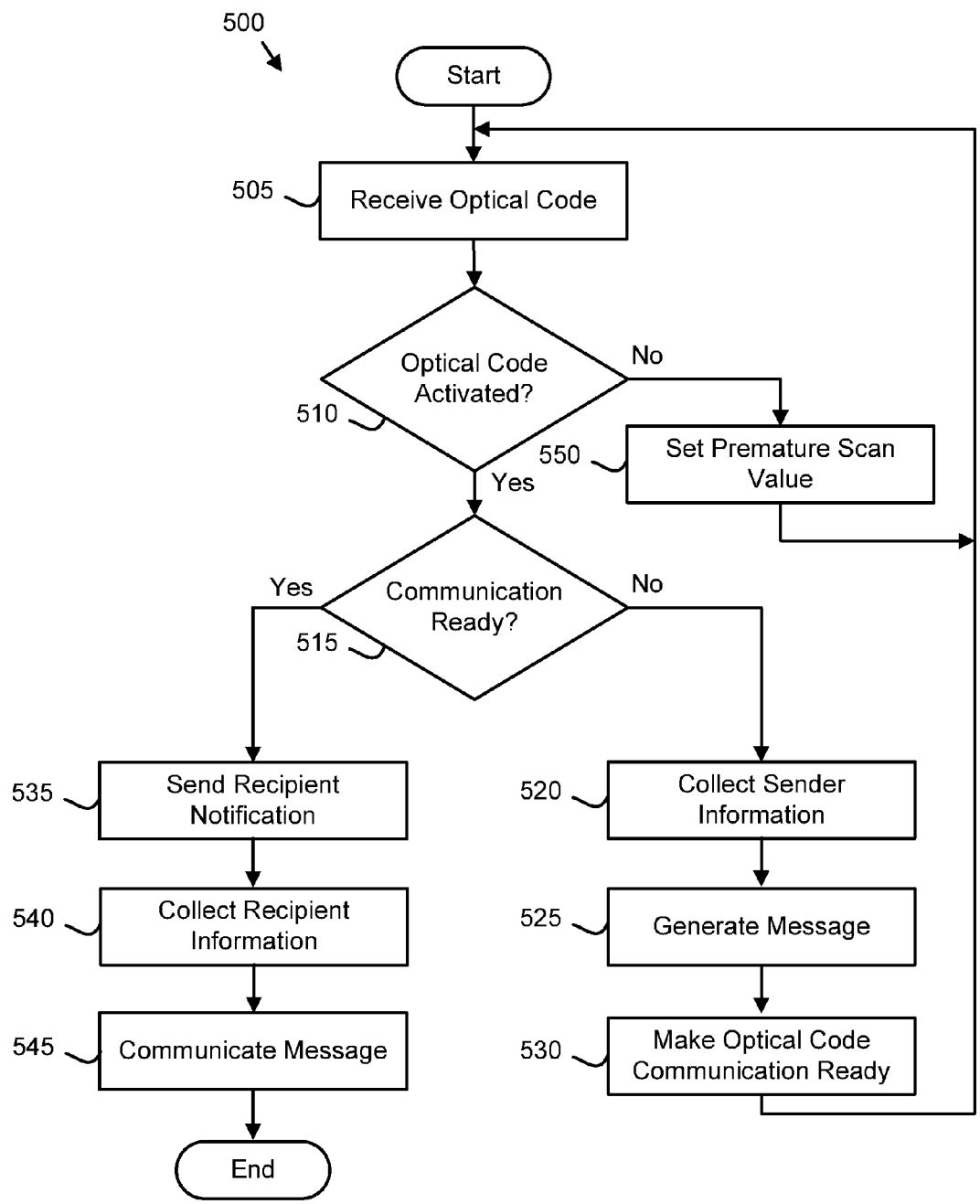
FIG. 7 is a schematic flow chart diagram illustrating one embodiment of a custom message presentation method.

FIG. 7 is a schematic flow chart diagram illustrating one embodiment of a custom message presentation method 500. The method 500 may perform the functions of the system and apparatus described in FIGS. 1-6. In one embodiment, the method 500 is performed by a computer readable storage medium such as the memory 210 storing computer readable program code that when executed by the processor 205 performs a function of the method 500.

The method 500 starts, and the identification module 220 receives 505 the optical code 110. In one embodiment, the electronic device 105 scans the optical code 120 and generates a digital representation of the optical code 110. The identification module 220 may receive 505 the optical code 120 multiple times. The embodiments described herein determine a proper course of action each time the optical code 120 is received 505, either generating the custom message 250 or communicating in the custom message 250 to a recipient.

In one embodiment, the identification module 220 determines 510 if the optical code 120 is activated. In a certain embodiment, the identification module 220 checks the activation value 365 to determine 510 if the optical code 120 is activated. If the optical code 220 is not activated, the identification module 220 may set 550 the premature scanned value 360 for the optical code 120 to true. The identification module 220 may then continue to receive 505 the optical code 120.

If the optical code 120 is activated 510, the identification module 220 may determine 515 if the optical code 120 is communication ready. In one embodiment, the identification module 220 accesses the communication ready value 350 to determine 515 if the optical code 120 is communication ready.

The message module 225 may collect 520 user information for the sender or sender information in response to identifying that the optical code is not communication ready. The message module 225 may receive the user information from the message generation interface 370.

The message module 225 may generate 252 a custom message 250 indexed to the optical code 120 in response to identifying that the optical code is not communication ready. The message module 225 may receive material from the message generation interface 370. In addition, the message module 225 may receive an arrangement of the material and generate the customer message from the material, the arrangement, and combinations thereof.

The optical code 120 may be communication ready if the optical code 120 is received 505 for a first time. Alternatively, the optical code 120 may be communication ready if the optical code 120 is received 505 for a first time after activation. In one embodiment, the optical code 120 is communication ready if a user account is associated with the optical code 120. The user account may be associated with the optical code 120 if there is a valid user account value 362 in the optical code data store 305.

In a certain embodiment, the optical code 120 is made communication ready in response to a user command. For example, the user may indicate that the optical code 120 is communication ready by selecting the ready to present icon 392 on the message generation interface 370.

If the optical code 120 is not communication ready, the message generation interface 370 may be displayed and collect 520 sender information. In one embodiment, the message module 225 may receive the sender information, store the sender information in the user data store 310, and establish an account for the sender.

The message module 225 may further generate 525 the custom message 250. In one embodiment, the message module 225 generates 525 the custom message 250 from the information received from the message generation interface 370 and stored in the message data store 315.

The message module 225 may further make 530 the optical code 220 communication ready. The optical code 120 may be made communication ready in response to the optical code 120 being received for the first time, in response to the optical code 120 being associated with the user account, in response to completion of the custom message 250, and/or in response to a user command such as the user selecting the ready to present icon 392. In one embodiment, the message module 225 makes 530 the optical code 120 communication ready by setting the communication ready value 350 to true. The identification module 220 may then monitor for and receive 505 the optical code 120.

If the optical code 120 is communication ready, the message module 225 may send 535 a notification to the recipient. The notification may be sent through a channel selected from the group consisting of a mobile device application, a browser, an email message, a text message, and a phone message. The notification may notify the recipient of the custom message 250. In addition, the notification may give the recipient the opportunity to provide user information in the form of recipient information. For example, the recipient may provide a name, an email address, a phone number, an address, a social media address, and the like. In a certain embodiment, the recipient may establish an account.

The message module 225 may collect 540 the recipient information. In addition, the message module 225 may store the recipient information in the user data store 310. In one embodiment, the message module 225 establishes an account for the recipient.

The message module 225 communicates 545 the custom message 250 to the recipient and the method 500 ends. The custom message 250 may be communicated 545 through a channel selected from the group consisting of a mobile device application, a browser, an email message, a text message, and a phone message. For example, the custom message 250 may be communicated to a browser of a mobile telephone electronic device 105. In one embodiment, the custom message 250 is communicative 545 through multiple channels.

The custom message 250 may be communicated 545 with an advertisement. In one embodiment, the advertisement is customized based on user information. The custom message 250 may also be communicated with a coupon. The coupon may be customized based on the user information.

Figure 8:
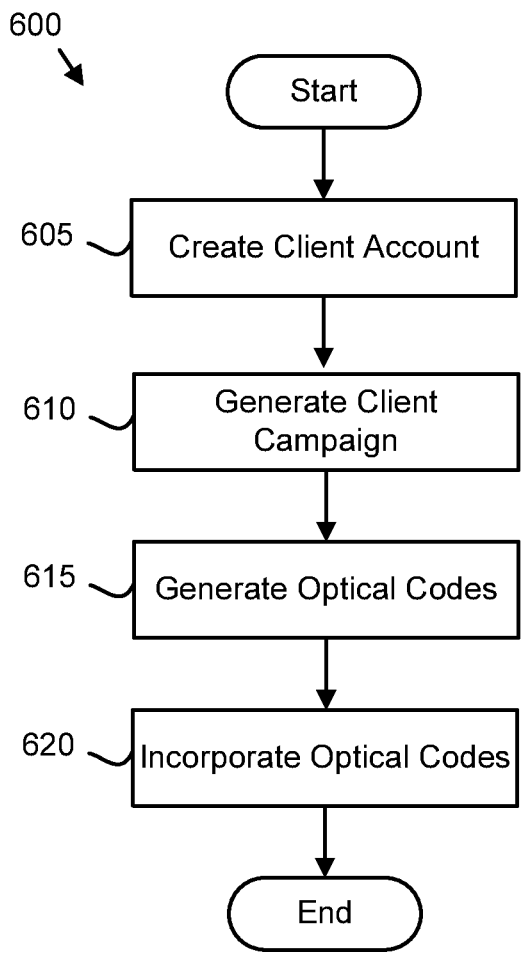
FIG. 8 is a schematic flow chart diagram illustrating one embodiment of an optical code generation method.

FIG. 8 is a schematic flow chart diagram illustrating one embodiment of an optical code generation method 600. The method 600 may generate client information stored in the client data store 325 and campaigns stored in the campaign data store 330. In one embodiment, the method 600 is performed by a computer readable storage medium such as the memory 210 storing computer readable program code that when executed by the processor 205 performs a function of the method 600.

The method 600 starts and the message module 220 creates 605 a client account. The message module 220 may employ a message generation interface 370 on electronic device 105 to collect client information. The message module 220 may receive the client information and store the client information that may include the client account in the client data store 325.

The message module 220 may further generate 610 a client campaign. In one embodiment, the message module 220 receives material and an arrangement of the material from the message generation interface 370 on the electronic device 105. The message module 220 may store the material and the arrangement of the material in the campaign data store 330.

The message module 220 may further generate 610 optical codes 120 for the campaign. Each optical code 120 may have a common address 340 and a unique identifier 345. In one embodiment, the message module 220 charges the client for each optical code 120 that is created.

In one embodiment, the message module 220 stores each optical code 120 in the optical code data store 305. The message module 220 may further initialize the communication ready value 350, the premature scanned value 360, the activated value 365, and the user account 362.

The message module 220 may incorporate 620 the optical codes 120 into a product 115, a sticker, or the like, and the method 600 ends. Alternatively, the message module 220 may provide the optical codes 120 to the client for incorporation 620 in the product 115, product packaging, or the like.

The embodiments allow a custom message 250 to be generated for each optical code 120 or communicated to a recipient as appropriate. When the optical code 120 is not communication ready, the custom message 250 is generated in response to receiving the optical code 120. When the optical code is communication ready, the custom message is communicated to the recipient.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for custom message presentation comprising:
identifying, by use of a processor, an optical code as not communication ready, wherein the optical code is not communication ready if the optical code is activated by a merchant in response to a purchase of the optical code by a sender and if the sender has not generated a custom message indexed to the optical code, and the optical code is a Quick Response (QR) code;
generating, by use of a processor, the custom message indexed to the optical code from custom message material selected by the sender in response to identifying the optical code as not communication ready;
making, by use of a processor, the optical code communication ready in response to generating the custom message; and
communicating, by user of a processor, the custom message in response to receiving the optical code and identifying the optical code as communication ready.

2. The method of claim 1, further comprising collecting, by use of a processor, user information wherein the user is selected from the group consisting of the sender and a recipient.

3. The method of claim 2, wherein collecting the user information comprises establishing an account for the sender to create the custom message.

4. The method of claim 2, wherein the user information comprises an email address, a social media address, a phone number, an address, and a personal identifier.

5. The method of claim 1, wherein the optical code is not communication ready if the optical code is received for a first time.

6. The method of claim 1, wherein the optical code is communication ready if a user account is associated with the optical code.

7. The method of claim 1, wherein the optical code is made communication ready in response to a user command.

8. The method of claim 1, wherein the custom message material comprises material selected from at least one of the group consisting of a Universal Resource Locator (URL), a video file, an audio file, an image file, a video transmission, an audio transmission, text, a video selection, an audio selection, an image selection, a text selection, and a composite selection.

9. The method of claim 8, wherein generating the custom message further comprises arranging the custom message material.

10. The method of claim 1, wherein the custom message is communicated through a channel selected from the group consisting of a mobile device application, a browser, an email message, a text message, and a phone message.

11. The method of claim 1, wherein the custom message is communicated with a promotional message and identifiers of a client.

12. The method of claim 1, wherein the custom message is communicated with at least one of an advertisement and a coupon.

13. The method of claim 12, wherein the at least one of the advertisement and the coupon is customized based on user information.

14. The method of claim 1, wherein the optical code is incorporated in packaging of a product for purchase.

15. The method of claim 1, wherein the optical code is incorporated on a product.

16. The method of claim 1, wherein the optical code is combined with a product by a user.

17. The method of claim 1, further comprising:
determining if the optical code is activated; and
setting a premature scan value for the optical code in response to determining that the optical code is not activated.

18. The method of claim 1, wherein the optical code is activated at a point-of-sale terminal.

19. An apparatus comprising:
a non-transitory computer-readable storage medium storing computer-readable program code executable by a processor, the computer-readable program code comprising:
an identification module identifying an optical code as not communication ready, wherein the optical code is not communication ready if the optical code is activated by a merchant in response to a purchase of the optical code by a sender and if the sender has not generated a custom message indexed to the optical code; and
a message module generating the custom message indexed to the optical code in response to identifying the optical code as not communication ready, making the optical code communication ready in response to generating the custom message, and communicating the custom message in response to receiving the optical code and identifying the optical code as communication ready.

20. A computer program product for custom message presentation, the computer program product comprising:
a non-transitory computer-readable storage medium having computer-readable program code embodied therein, the computer-readable program code configured to:
identify an optical code as not communication ready, wherein the optical code is not communication ready if the optical code is activated by a merchant in response to a purchase of the optical code by a sender and if the sender has not generated a custom message indexed to the optical code;
generate the custom message indexed to the optical code in response to identifying the optical code as not communication ready;
make the optical code communication ready in response to generating the custom message; and
communicate the custom message in response to receiving the optical code and identifying the optical code as communication ready.

* * * * *